United States Patent [19]
Evans

[11] Patent Number: 6,148,619
[45] Date of Patent: Nov. 21, 2000

[54] METHOD AND APPARATUS FOR NON-INVASIVELY FREEZING A CONTENT OF A PIPE

[76] Inventor: Daniel J. Evans, 1048 Barcelona Dr., Kissimmee, Fla. 34741

[21] Appl. No.: 09/375,409

[22] Filed: Aug. 17, 1999

[51] Int. Cl.[7] ......................................................... F25D 3/00
[52] U.S. Cl. .................................. 62/66; 62/293; 165/46
[58] Field of Search ............................... 62/66, 293, 340; 138/97; 165/46, 164, 168

[56] References Cited

U.S. PATENT DOCUMENTS

| | | | |
|---|---|---|---|
| 3,674,031 | 7/1972 | Weiche | 128/303.1 |
| 3,695,301 | 10/1972 | Pittman | 138/97 |
| 4,213,498 | 7/1980 | Vandenbossche | 165/46 |
| 4,309,875 | 1/1982 | Radichio | 62/66 |
| 4,416,118 | 11/1983 | Brister | 62/66 |
| 4,433,556 | 2/1984 | Brady | 62/293 |
| 4,441,328 | 4/1984 | Brister | 62/53 |
| 4,944,161 | 7/1990 | Van Der Sanden | 62/293 |
| 5,345,995 | 9/1994 | Yano et al. | 165/46 |
| 5,377,495 | 1/1995 | Daigle | 165/46 |
| 5,548,965 | 8/1996 | Chen et al. | 62/66 |
| 5,571,233 | 11/1996 | Rolland et al. | 62/293 |
| 5,836,167 | 11/1998 | Clouston et al. | 62/66 |

*Primary Examiner*—William E. Tapolcai
*Attorney, Agent, or Firm*—Liniak, Berenato, Longacre & White, LLC

[57] ABSTRACT

A method, apparatus, and kit are provided for non-invasively freezing a content of a pipe. The method comprises the steps of applying a substantially continuous seal over an outside surface of a pipe at a location where a content of the pipe is to be frozen, covering a surface area of the pipe with a cover sheet in such a way that the substantially continuous seal separates the cover sheet from the surface area to define a cavity between the surface area and the cover sheet, and introducing a cryogenic fluid into the cavity to draw heat away from a content of the pipe, through the surface area. A periphery of the cavity is defined by the substantially continuous seal. The method advantageously provides an apparatus for freezing the content of the pipe. A kit can be used to assemble the apparatus. Advantageously, the method, apparatus 80, and kit provide a non-invasive way of freezing the pipe's content. There is no need to penetrate the wall of the pipe to insert any complex structures or mechanisms. Nor do the method, apparatus, and kit require multiple complex devices, each of which accommodates different diameters of pipe. The method, apparatus, and kit advantageously can be used at locations along the pipe where there are external obstructions 30. They also can be used in such a way that the escape of cryogenic fluids into the atmosphere is minimized, if not eliminated.

27 Claims, 3 Drawing Sheets

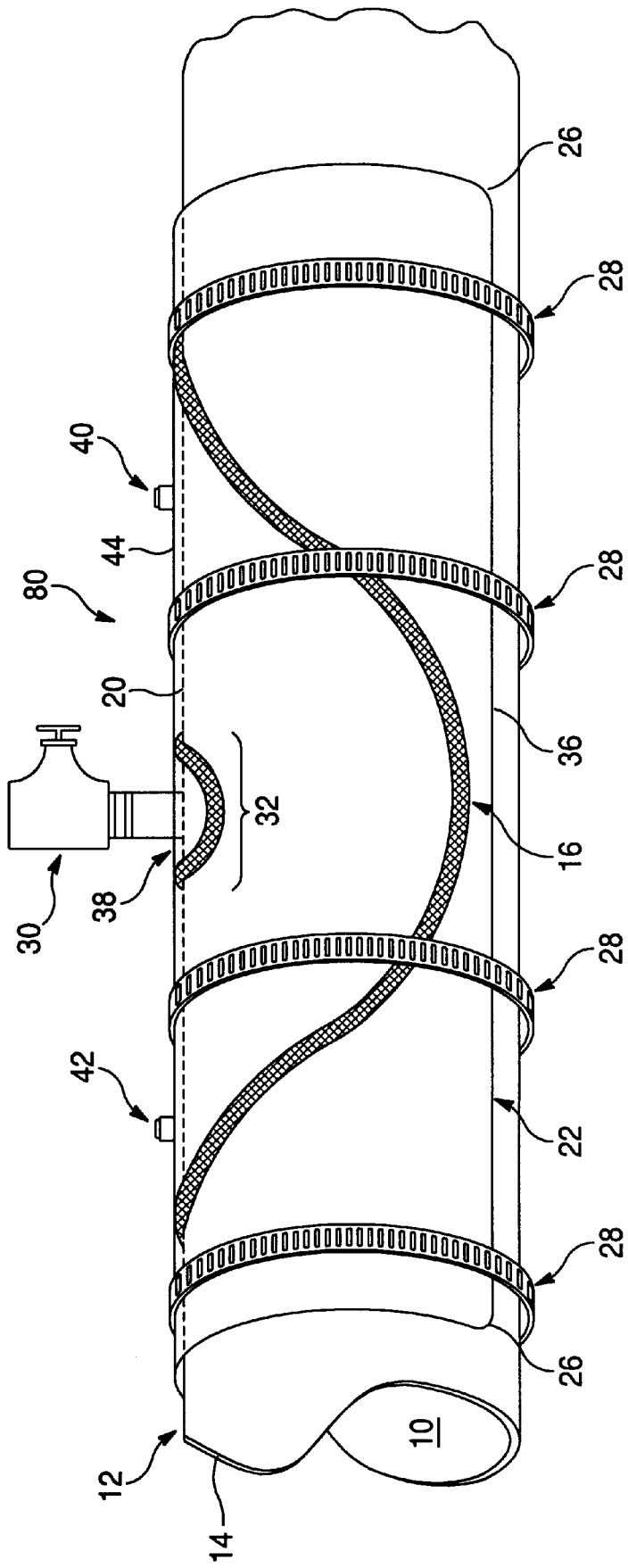

METHOD AND APPARATUS FOR NON-INVASIVELY FREEZING A CONTENT OF A PIPE

BACKGROUND OF THE INVENTION

The present invention relates to a method and apparatus for freezing the content of a pipe in a non-invasive manner.

There are various situations where it is desirable to terminate the flow of fluids through a pipe. One example involves defective valve replacement. When a valve leaks, routine maintenance of equipment, or replacement of the valve generally is not practical without shutting down the entire system and draining the pipe. Shutting down of the entire system, however, is not practical when critical operations must be maintained using the system.

A second example is where a valve was not installed in a branch line during original construction, but must be installed now in the pipe without shutting down the entire system. In either case, a freeze of the pipe contents would be desirable upstream and downstream of the desired valve site in order to prevent loss of fluid, chemical treatment, or both. In addition to advantageously avoiding drainage of the system, freezing would eliminate the need for refilling and venting of air from elements of the fluid network (e.g., heat transfer equipment and coils).

With the foregoing difficulties as a background, several devices and methods have been developed for plugging an existing pipe to stop the flow of fluid through the pipe. Some of those devices and techniques involve insertion of a plug through a hole in the pipe or otherwise, and in some cases, inflation of the plug after insertion. At least one device and technique involves freezing of the material which is used to inflate the plug and/or external application of a cooling device to the pipe which assists in freezing of the material in the plug.

With regard to the devices and techniques that insert a plug into the contents of the pipe, the use of such devices and techniques is limited to those pipes which are compatible with the size and shape of the plug. If a wide range of pipe sizes and shapes are to be plugged, multiple plugs must be provided, each having a different size and/or shape. If the material which makes up the plug is flexible and/or the plug is inflatable, then care must be taken to ensure that such material is compatible with the contents of the various pipes into which the plugs will be inserted. The process of inserting and/or inflating the plug also can be rather complicated.

Still other devices and techniques provide a cooling device only to an outside surface of the pipe. Such devices draw heat from the contents of the pipe, through the pipe itself, and eventually freeze the contents of the pipe to form a plug. Many of those devices and techniques, however, are designed for a particular pipe diameter. It is difficult to apply such devices to pipes having different diameters without providing multiple devices, each of which is designed for a particular pipe diameter. The use of multiple devices, however, is seldom practical. Those devices must be carried by the user and/or stored. As a result, such devices and techniques tend to be cumbersome and wasteful of space.

Some of the devices that are applied externally also fail to adequately contain the cryogenic fluids that are used to draw the heat through the wall of the pipe. Some are permeable to the cryogenic fluid, have no seals, or have inadequate seals. As a result, a substantial amount of the cryogenic fluid is allowed to escape. When used with Freon, for example, all or most of the Freon escapes into the atmosphere. This, however, is not consistent with recent environmental efforts and regulations directed to the reduction of Freon emissions.

In addition, many of the existing devices that are applied externally have structures that completely surround the pipe to be frozen. This makes it difficult, if not impossible, to freeze the contents of a pipe locally where the pipe has external obstacles, such as a branch pipe extending out from the pipe to be frozen.

There is consequently a need in the art for a non-invasive device and/or method capable of locally preventing flow through a pipe, by freezing the content of a pipe, without the need for insertion and inflation of a plug. There is also a need for a device and/or method capable of freezing the content of a pipe, without having to introduce any structure through the wall of the pipe, without having to provide multiple devices to accommodated different diameters of pipe, without being limited to use at locations along the pipe where there are no external obstructions, and/or while minimizing the escape of cryogenic fluids into the atmosphere.

Hereinafter, the term "cryogenic" is used in its broadest sense. It encompasses not only subject matter involving super-cooled fluids, but also subject matter involving refrigerants instead of super-cooled fluids, regardless of whether applied using an open flow arrangement or a closed refrigeration loop.

SUMMARY OF THE INVENTION

It is a primary object of the present invention to resolve at least one of the foregoing problems and/or satisfy at least one of the foregoing needs by providing a method and apparatus for non-invasively freezing a content of a pipe.

To achieve this and other objects, the method comprises the steps of applying a substantially continuous seal over an outside surface of a pipe at a location where a content of the pipe is to be frozen, covering a surface area of the pipe with a cover sheet in such a way that the substantially continuous seal separates the cover sheet from the surface area to define a cavity between the surface area and the cover sheet, and introducing a cryogenic fluid into the cavity to draw heat away from a content of the pipe, through the surface area. A periphery of the cavity is defined by the substantially continuous seal.

The present invention also provides an apparatus for freezing a content of a pipe. The apparatus comprises a substantially continuous seal, a cover sheet, and a cryogenic fluid introduction port. The substantially continuous seal is located over an outside surface of a pipe at a location where a content of the pipe is to be frozen. The cover sheet covers a surface area of the pipe in such a way that the substantially continuous seal separates the cover sheet from the surface area to define a cavity between the surface area and the cover sheet. A periphery of the cavity is defined by the substantially continuous seal. The cryogenic fluid introduction port communicates with the cavity to permit introduction of cryogenic fluid into the cavity through the port, to draw heat away from a content of the pipe through the surface area.

Also provided by the present invention is a kit for freezing a content of a pipe. The kit comprises a substantially continuous seal, a cover sheet, a cryogenic fluid vent and introduction port, and a cryogenic fluid supply system. The substantially continuous seal is adapted to be draped over an outside surface of a pipe at a location where a content of the pipe is to be frozen. The cover sheet is adapted to cover a surface area of the pipe in such a way that the substantially continuous seal separates the cover sheet from the surface area to define a cavity between the surface area and the cover sheet. The cryogenic fluid introduction port is located on the cover sheet. The cryogenic fluid supply system is connectable to the introduction port and is adapted to introduce cryogenic fluid into the cavity.

The above and other objects and advantages will become more readily apparent when reference is made to the following description taken in conjunction with the accompanying drawings.

BRIEF DESCRIPTION OF THE DRAWINGS

FIG. 3 is a fragmentary perspective view of an apparatus for freezing the content of a pipe according to an alternative embodiment of the present invention that can be used when an external obstruction is located at or near the pipe.

DESCRIPTION OF PREFERRED EMBODIMENTS

Figure 1:
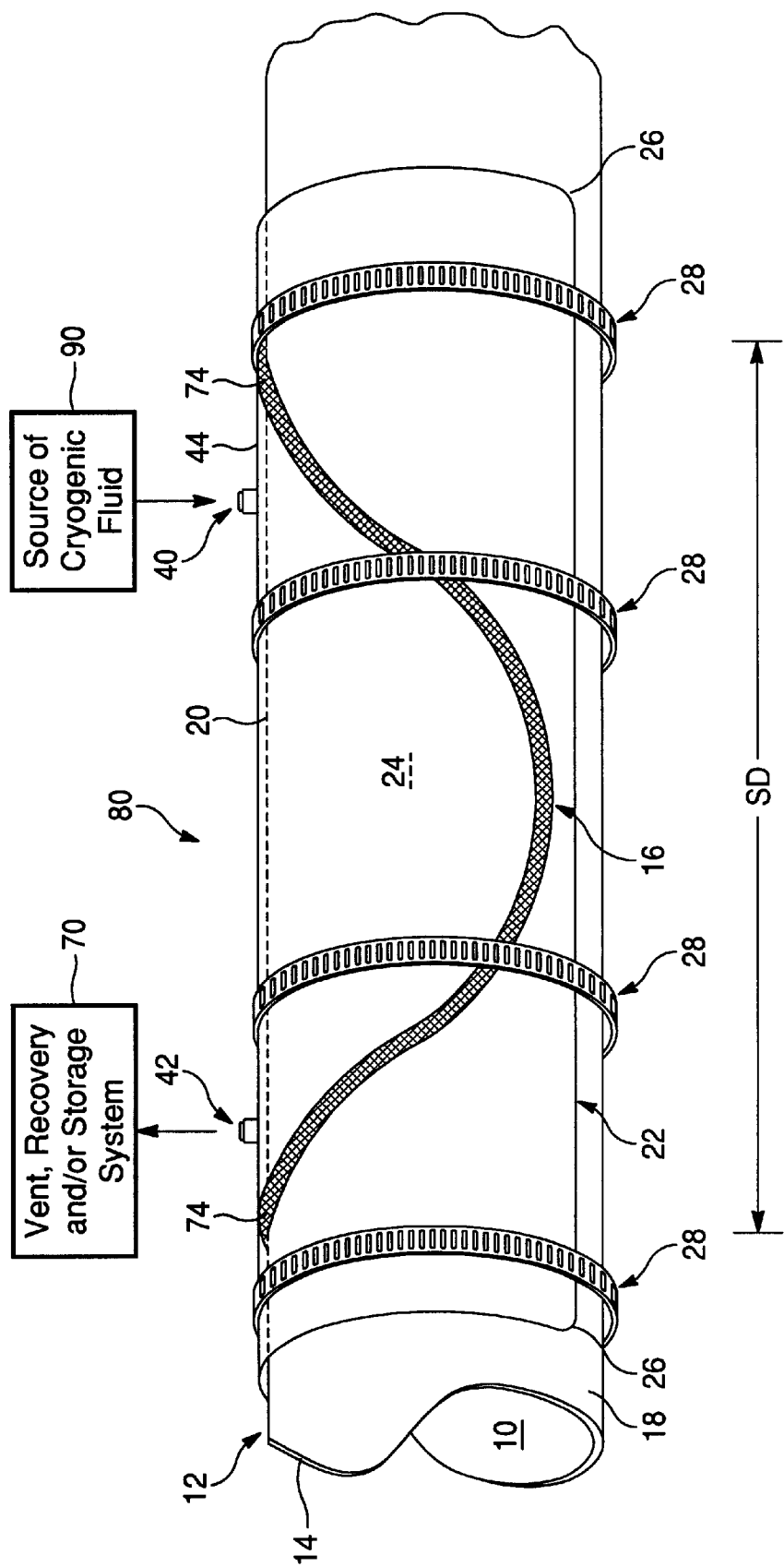
FIG. 1 is a fragmentary perspective view of an apparatus for freezing the content of a pipe according to a preferred embodiment of the present invention.
Figure 2:
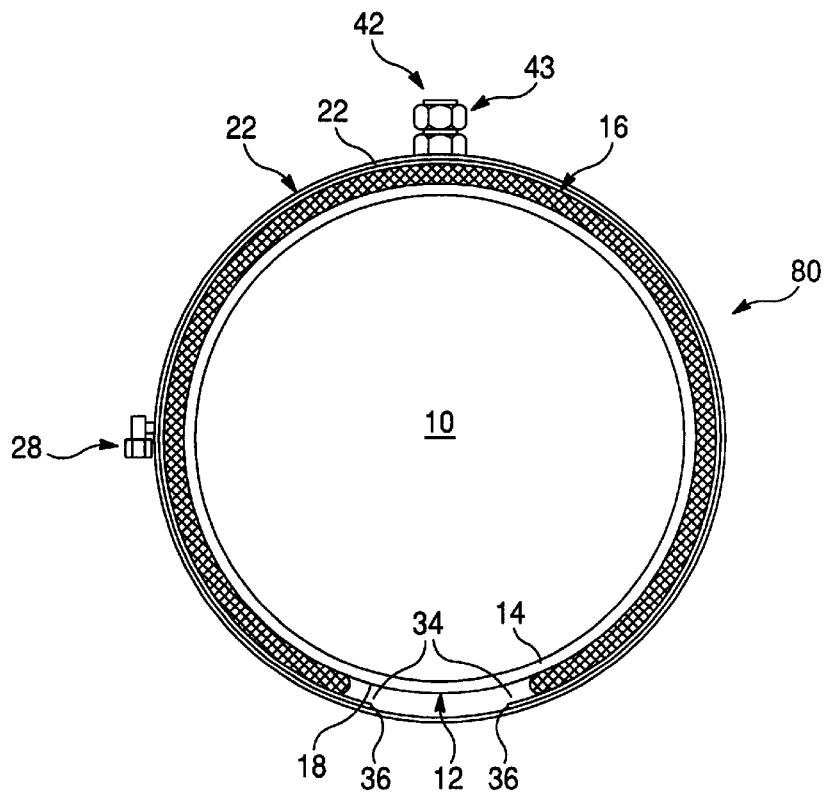
FIG. 2 is a cross-sectional view of the preferred embodiment illustrated in FIG. 1.

As illustrated in FIGS. 1 and 2, the present invention provides a method for non-invasively freezing a content 10 of a pipe 12. The method is non-invasive to the extent that the wall 14 of the pipe 12 need not be breached to achieve the desired freezing of the pipe's content 10.

The method comprises the steps of applying a substantially continuous seal 16 over an outside surface 18 of a pipe 12 at a location where the content 10 of the pipe 12 is to be frozen, covering a surface area 20 of the pipe 12 with a cover sheet 22 in such a way that the seal 16 separates the cover sheet 22 from the surface area 20 to define a cavity 24 (as perhaps best shown in FIG. 4) between the surface area 20 and the cover sheet 22, and introducing a cryogenic fluid into the cavity 24 to draw heat away from the content 10 of the pipe 12. The heat is drawn through the surface area 20 of the pipe 12 and is absorbed by the cryogenic fluid.

In FIG. 1, the cover sheet 22 appears transparent to indicate more clearly how the seal 16 is arranged. Actual implementations of the invention, however, do not require a transparent cover sheet 22 (e.g. when the cover sheet 22 is made of sheet metal).

The seal 16 defines the periphery of the cavity 24. As illustrated in FIG. 1, the seal 16 can be draped over the pipe 12 to provide a saddle-like shape. Alternative shapes also can be provided using the seal 16.

Preferably, the seal 16 is provided using a flexible and/or resilient O-ring, or other continuous structure capable of providing the requisite sealing function. The O-ring can be made of rubber, synthetic materials, or other suitable materials. In some situations, it may be desirable to adhesively secure the seal 16 in place on the pipe 12. The seal 16 preferably is made of a material that provides a desirable amount of resiliency and/or flexibility.

Resiliency is preferred because, among other things, it facilitates the sealing process even when the surface area 20 of the pipe 12 and/or the cover sheet 22 have irregular features in contact with the seal 16. The flexibility is preferred because, among other things, it allows the seal 16 to be arranged in different configurations on the outside of the pipe 12 to compensate for differences in pipe shape, differences in pipe diameter, differences in the location, size, and shape of external obstacles and/or features on or around a pipe 12, and the like. Flexibility also facilitates draping of the seal 16 over the pipe 12.

By providing a continuous seal structure (i.e., by providing the seal 16 in the form of a completely closed loop), it is possible to close off the cavity 24 from the surrounding atmosphere. Cryogenic fluid introduced into the cavity 24 therefore can be kept from contaminating the surrounding atmosphere.

The step of covering the surface area 20 using the cover sheet 22 preferably includes bending of the cover sheet 22 around the pipe 12 so that the cover sheet 22 substantially conforms to the external shape and diameter of the pipe 12. The cover sheet 22, in this regard, can be made using sheet metal, TEFLON, or any other sheet material, that permits bending for purposes of conforming to different pipe shapes and/or diameters. The corners 26 of the cover sheet 22 can be rounded, as shown in FIG. 1, or alternatively, can be square.

Once the cover sheet 22 is suitably arranged against the seal 16 so that it engages and covers the seal 16, the cover sheet 22 is secured tightly against the seal 16 using at least one clamping mechanism 28. Preferably, at least four clamping mechanisms 28 are used, as shown in FIG. 1. The exemplary ring clamps 28 shown in FIGS. 1 and 2 are preferred because they are readily adjustable and bendable to accommodate many different pipe diameters and shapes. They also are relatively inexpensive. Advantageously, the exemplary ring clamps 28 are commercially available from many different suppliers.

By providing the cover sheet 22 using a bendable sheet material, the present invention facilitates flattening of such cover sheets 22 for purposes of storage, thereby allowing many cover sheets 22 having different dimensions to be compactly stored flat against one another. This, in turn, greatly expands the range of pipe sizes that can be conveniently accommodated by the exemplary method. A compactly stored collection of such differently sized cover sheets 22, each of which works well on a respective range of pipe diameters, thus can provide cover sheets 22 that are suitable for a cumulatively larger range of pipe diameters. Likewise, since the sheet material is relatively inexpensive when compared to complex pipe freezing structures, some of which are molded or otherwise constructed to fit around a predetermined size and shape of pipe, the exemplary method facilitates one-time or few-time uses of the sheet material without incurring undue expense. It therefore is not unduly expensive to cut the sheet material or otherwise modify its shape to accommodate an obstacle located on or about the outside of the pipe 12.

As illustrated in FIG. 3, the step of applying the substantially continuous seal 16 may include the step of circumventing an external obstacle 30 located where the content 10 of the pipe 12 is to be frozen. Examples of external obstacles 30 commonly found on pipes 12 are branch pipes, meters, valves or other control features, fluid outlets, and support structures that physically support or protect the pipe 12. The seal 16 in FIG. 3, for example, has been draped so that it circumvents a branch pipe 30. In particular, the circumvented portion 32 of the seal 16 has been drawn up so that the branch pipe 30 does not prevent the seal 16 from being covered by the cover sheet 22.

The method also can include the step of shaping (e.g., by bending or cutting) or positioning the cover sheet 22 so that the external obstacle (e.g., the branch pipe 30 in FIG. 3) does not interfere with the cover sheet 22. The cover sheet 22, for example, can be bent around the external obstacle 30 or repositioned (e.g., by placing the opening 34 between edges 36 of the cover sheet 22 over the external obstacle 30) so that the external obstacle 30 does not interfere with the cover sheet 22. FIG. 2 would show an example of such an arrangement if there had been an external obstacle in FIG. 2 projecting straight down from the pipe 12.

Since the cover sheet 22 preferably is made using a sheet metal or some other inexpensive sheet material, it is not unduly expensive to modify the shape of the cover sheet 22 (e.g., by cutting around the external obstacle 30 or otherwise) for each application of the method and to dispose of that cover sheet 22 after use of the method. Similarly, even if the cover sheet 22 is modified for a particular application by cutting a portion 38 of it away, the cover sheet 22 can be recycled for future applications by cutting it for re-use on smaller pipe diameters. The exemplary method thus provides a more versatile and economical way of freezing pipe contents 10 when compared to other methods using rigid, pre-shaped, or complex structures adapted for use on a particular size and shape of pipe 12.

Preferably, the method further comprises the step of withdrawing the cryogenic fluid from the cavity 24 after the cryogenic fluid has absorbed heat from the content 10 of the pipe 12. In this regard, the cover sheet 22 can be provided with at least one cryogenic fluid introduction port 40 and at least one cryogenic gas withdrawal port 42. Preferably, the introduction port(s) 40 are spaced relatively far apart from the withdrawal port(s) 42. This way, the cryogenic fluid entering through the introduction port 40 flows across most of the surface area 20, absorbing heat along the way, and out through the remotely located withdrawal port 42. If the section of pipe 12 to be frozen extends even the slightest bit vertically, it is preferred to arrange the introduction port 40 near the bottom and the withdrawal port 42 near the top.

Couplings 43 to the introduction port(s) 40 and withdrawal port(s) 42 can be welded, soldered, or mechanically joined to the outside surface 44 of the cover sheet 22. These couplings 43 can be joined to the cover sheet 22 before or after creation of the various ports 40,42 (i.e. or the holes that define the ports 40,42) in the cover sheet 22.

Figure 4:
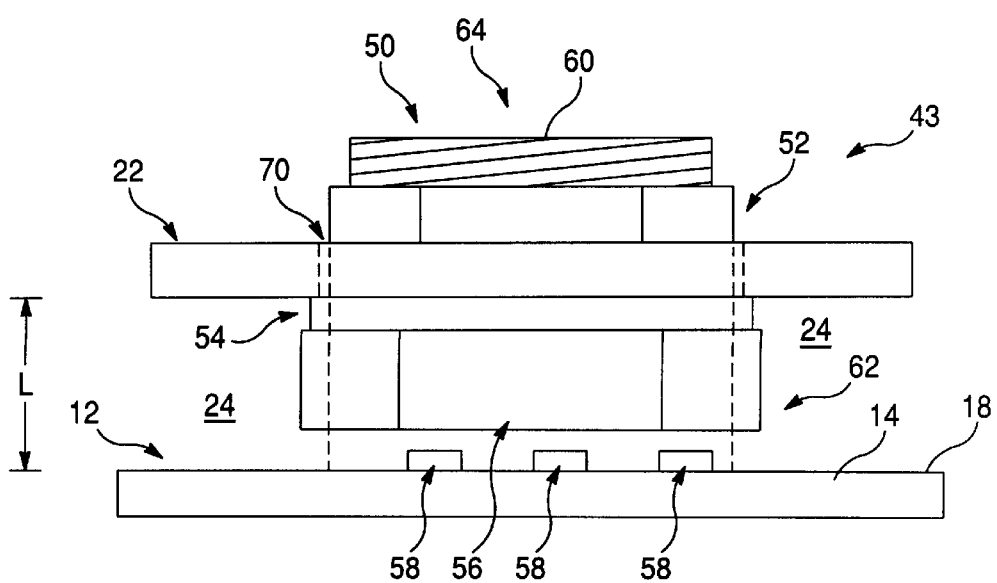
FIG. 4 is an elevation view of a coupling structure according to a preferred embodiment of the present invention.

As shown in FIG. 4, a preferred coupling structure 43 includes a hollow compression or flared fitting 50, an external locknut 52, an O-ring 54, an internal locknut 56, and a plurality of liquid-to-gas ports 58 arranged about the fitting 50. The fitting 50 has an open end 60 outside of the cavity 24. The fitting 50 passes through a suitable hole 70 in the cover sheet 22, and the external and internal locknuts 52,56 then are threadedly applied to the fitting 50 on opposite sides of the cover sheet 22. The O-ring 54 of the coupling structure 43 is located between the internal locknut 56 and the cover sheet 22 to provide a tight hermetic seal when the internal and external locknuts 56,52 are tightened to compress the O-ring 54 and cover sheet 22 between the locknuts 52,56. The internal locknut 56 preferably has a small enough profile that it does not interfere with compression of the substantially continuous seal 16 by the clamps 28.

The positioning of the locknuts 52,56 axially along the length of the fitting 50 can be selectively varied so that the length L of the portion 62 of the fitting 50 that extends into the cavity 24 does not preclude the cover sheet 22 from adequately compressing the substantially continuous seal 16. In this regard, the fitting 50 should not bottom out against the pipe 12. If it does bottom out, it should not do so until the substantially continuous seal 16 has been adequately compressed. This way, the fitting 50 does not prevent an adequate seal from being formed by the combination of the cover sheet 22 and the substantially continuous seal 16.

The fitting 50 has an internal passageway 64 for the cryogenic fluid. When the coupling structure 43 is used at a cryogenic fluid introduction port 40, the liquid-to-gas ports 58 communicate with the internal passageway 64 so that cryogenic fluid applied to the internal passageway 64 flows into the cavity 24 and/or vaporizes therein. At the withdrawal ports 42, by contrast, the same kind of liquid-to-gas ports 58 can be used to communicate heated cryogenic fluid from the cavity 24 into the internal passageway 64 of the fitting 50 for recovery, storage, or exhausting of the cryogenic fluid. Thus, the liquid-to-gas ports 58 preferably do not operate as "liquid-to-gas" ports when applied to the withdrawal port(s) 42.

If Freon is used, or other cryogenic fluids that are environmentally harmful or otherwise worthy of recovery, the cryogenic fluid withdrawal port(s) 42 can be connected to a suitable recovery system 70 or a container where the cryogenic fluid is recovered and/or stored. This way, contamination of the surrounding atmosphere by the cryogenic fluid can be prevented.

On the other hand, if the cryogenic fluid is environmentally benign, such as liquid nitrogen, then the fluid withdrawal port(s) 42 can be left open to expel the cryogenic fluid after it absorbs heat from the surface area 20 of the pipe 12. The fluid withdrawal port(s) 42 also can be connected to a hose and/or suitable exhaust duct for purposes of directing and/or expelling the heated cryogenic fluid away from personnel who are performing the pipe freezing operation.

The cavity 24 provided by the exemplary method advantageously serves as an expansion chamber. As the cryogenic fluid enters the cavity 24, it absorbs heat transferred to it through the surface area 20 of the pipe 12 and vaporizes. The vaporization of the fluid advantageously draws more heat energy away from the content 10 because additional energy is required to change the phase of the fluid to a gas under the law of enthalpy.

Preferred implementations of the present inventions are carried out using a cover sheet 22 made of thin-gauge metal that is rolled to a size substantially equal to the sum of (1) the outer diameter of the pipe 12 to be frozen and (2) twice the diametric thickness of the O-ring that defines the substantially continuous seal 16. The O-ring used to define the substantially continuous seal 16 preferably has a diametric thickness of about 0.5 inch. Preferably, the substantially continuous seal 16 is sized and arranged so that the sectional distance SD between the most distant parts 74 of the substantially continuous seal 16 along the length of the pipe is about 1.5 times the pipe's diameter.

While a preferred cryogenic fluid is liquid nitrogen, it will be appreciated that the invention is not limited to liquid nitrogen. The present invention can be implemented using cryogenic fluids other than liquid nitrogen, so long as such fluids are capable of achieving the desired results in the intended application of the method and apparatus. The exemplary method also may be practiced using a closed-loop refrigeration system, in which case the cavity 24 can serve as an expansion chamber of the closed-loop refrigeration system.

The exemplary method thus provides a convenient apparatus 80 for freezing the content 10 of a pipe 12. The resulting apparatus 80 comprises the substantially continuous seal 16 (e.g., the aforementioned O-ring), the cover sheet 22, and the cryogenic fluid introduction port 40. As indicated above, the substantially continuous seal 16 is applied over an outside surface 18 of the pipe 12 at a location where the content 10 of the pipe 12 is to be frozen. The cover sheet 22 covers a surface area 20 of the pipe 12 in such a way that the substantially continuous seal 16 separates the cover sheet 22 from the surface area 20. This separation defines the cavity 24.

The cavity 24, as indicated above, can be completely closed from the surrounding atmosphere (e.g., by providing the seal 16 in the form of a closed loop and/or by connecting the introduction and withdrawal ports 40,42 to the respective cryogenic supply system and recovery systems in a fluid-tight manner), or can be partially open to expel the cryogenic fluid into the atmosphere after heat has been absorbed, through the surface area 20, from the content 10 of the pipe 12.

The cryogenic fluid introduction port 40 communicates with the cavity 24 to permit introduction of the cryogenic fluid into the cavity 24 through the introduction port 40. A source 90 of cryogenic fluid (e.g., a liquid nitrogen tank with an appropriate valve and/or pressure regulator) can be connected to the introduction port 40.

The apparatus 80 further includes at least one clamping mechanism 28 adapted to secure the cover sheet 22 against the seal 16. As shown in the drawings, the clamping mechanism preferably comprises four ring clamps 28.

Since the exemplary seal 16 is sufficiently flexible that it can be draped and/or arranged in different shapes, it can accommodate virtually any external obstacle located where the content 10 of the pipe 12 is to be frozen. The branch pipe 30 in FIG. 3 is an example of such an obstacle. In FIG. 3, the cover sheet 22 covers the entire seal 16, yet it is shaped and/or positioned to accommodate the external obstacle 30. In particular, a slot 38 in the cover sheet 22 accommodates the obstacle 30. Such shaping can be provided by cutting, bending, or otherwise. If reshaping of the cover sheet 22 becomes undesirable, the size of the cover sheet 22 can be selected so that, when it is folded around the pipe 12, it leaves a separation 34 between its edges 36 that accommodates the external obstacle 30. The cover sheet 22 preferably is conformable to an external shape and diameter of a pipe 12.

Preferably, the present invention also provides a kit for freezing the content 10 of a pipe 12. In particular, the kit can be provided in such a way that a user can combine its individual elements to create the foregoing pipe-freezing apparatus 80.

The kit can comprise, for example, the substantially continuous seal 16 (e.g., the aforementioned flexible O-ring), the cover sheet 22, the cryogenic fluid introduction port 40, and the cryogenic fluid supply system 90. The seal 16, as indicated above, can be adapted to be draped over an outside surface 18 of a pipe 12 at the location along the pipe's length where its content 10 is to be frozen. The cover sheet 22 is adapted to cover a surface area 20 of the pipe 12 in such a way that the substantially continuous seal 16 separates the cover sheet 22 from the surface area 20 to define a cavity 24 between the surface area 20 and the cover sheet 22.

The cryogenic fluid introduction port 40 of the kit is located on the cover sheet 22. The cryogenic fluid supply system 90 is connectable to the introduction port 40 and is adapted to introduce cryogenic fluid (e.g., liquid nitrogen) into the cavity 24. The cover sheet 22 of the kit also can include a cryogenic fluid withdrawal port 42 spaced apart from the cryogenic fluid introduction port 40. Preferably, the cover sheet 22 is provided using a conformable material(s), so that the cover sheet 22 can be conformed to the shape and diameter of the pipe 12. The kit also can include the clamping mechanism(s) (e.g., the illustrated four ring clamps 28).

Notably, the kit can be compiled using an inventive combination of commercially available components, most of which are relatively inexpensive (e.g., the clamps 28, O-ring 16, and cover sheet 22). The kit is readily adaptable to different pipe sizes and shapes, and can easily accommodate external obstructions 30 at the location where the pipe 12 is to be frozen.

Advantageously, the method, apparatus 80, and kit of the present invention provide a non-invasive way of freezing the content 10 of a pipe 12. There is no need to penetrate the wall 14 of the pipe 12 to insert any complex structures or mechanisms. The risks associated with such penetration (e.g., the danger of spilling, contamination, and the like) therefore are avoided. Nor does the present invention require multiple complex devices, each of which accommodates different diameters of pipe. The method, apparatus 80, and kit advantageously can be used at locations along the pipe 12 where there are external obstructions 30. They also can be used in such a way that the escape of cryogenic fluids into the atmosphere is minimized, if not eliminated. The present invention thus provides a versatile and advantageous method, apparatus 80, and kit.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A method for non-invasively freezing a content of a pipe, said method comprising the steps of:

applying a substantially continuous seal over an outside surface of a pipe at a location where a content of the pipe is to be frozen;

covering a surface area of the pipe with a cover sheet in such a way that the substantially continuous seal separates the cover sheet from the surface area to define a cavity between the surface area and the cover sheet, a periphery of the cavity being defined by the substantially continuous seal; and introducing a cryogenic fluid into the cavity to draw heat away from a content of the pipe, through said surface area.

2. The method of claim 1, further comprising the step of withdrawing cryogenic fluid from the cavity after the cryogenic fluid has absorbed heat from a content of the pipe.

3. The method of claim 1, further comprising the step of introducing and withdrawing said cryogenic fluid from the cavity substantially without contaminating a surrounding atmosphere with the cryogenic fluid.

4. The method of claim 1, further comprising the step of closing said cavity to a surrounding atmosphere.

5. The method of claim 1, further comprising the step of securing the cover sheet against the substantially continuous seal using a clamping mechanism.

6. The method of claim 1, wherein said step of applying the substantially continuous seal includes the step of circumventing an external obstacle located where a content of the pipe is to be frozen.

7. The method of claim 6, wherein said step of covering the surface area includes the step of shaping or positioning the cover sheet so that the external obstacle does not interfere with the cover sheet.

8. The method of claim 1, wherein said step of covering the surface area includes bending of the cover sheet around a pipe so that the cover sheet substantially conforms to an external shape and diameter of a pipe.

9. The method of claim 1, wherein the step of applying the substantially continuous seal comprises draping a resilient O-ring over an outside surface of a pipe.

10. The method of claim 1, wherein said substantially continuous seal forms a closed loop.

11. An apparatus for freezing a content of a pipe, comprising:

a substantially continuous seal over an outside surface of a pipe at a location where a content of the pipe is to be frozen;

a cover sheet covering a surface area of the pipe in such a way that the substantially continuous seal separates the cover sheet from the surface area to define a cavity between the surface area and the cover sheet, a periphery of the cavity being defined by the substantially continuous seal; and a cryogenic fluid introduction port that communicates with the cavity to permit introduction of cryogenic fluid into the cavity through the port, to draw heat away from a content of the pipe through said surface area.

12. The apparatus of claim 11, further comprising a source of cryogenic fluid connected to the introduction port.

13. The apparatus of claim 11, further comprising a cryogenic fluid withdrawal port through which cryogenic fluid can be withdrawn from the cavity.

14. The apparatus of claim 11, wherein said cavity is closed to a surrounding atmosphere.

15. The apparatus of claim 11, further comprising at least one clamping mechanism adapted to secure the cover sheet against the substantially continuous seal.

16. The apparatus of claim 11, wherein said substantially continuous seal is configured to accommodate an external obstacle located where a content of the pipe is to be frozen.

17. The apparatus of claim 16, wherein said cover sheet is shaped or positioned to accommodate the external obstacle.

18. The apparatus of claim 11, wherein the cover sheet is conformable to an external shape and diameter of a pipe.

19. The apparatus of claim 11, wherein the substantially continuous seal comprises a resilient O-ring draped over an outside surface of a pipe.

20. A kit for freezing a content of a pipe, comprising:

a substantially continuous seal adapted to be draped over an outside surface of a pipe at a location where a content of the pipe is to be frozen;

a cover sheet adapted to cover a surface area of the pipe in such a way that the substantially continuous seal separates the cover sheet from the surface area to define a cavity between the surface area and the cover sheet;

a cryogenic fluid introduction port on the cover sheet; and a cryogenic fluid supply system connectable to the introduction port and adapted to introduce cryogenic fluid into the cavity.

21. The kit according to claim 20, further comprising a cryogenic fluid withdrawal port on the cover sheet and spaced apart from the cryogenic fluid introduction port.

22. The kit according to claim 20, wherein said cover sheet and substantially continuous seal are adapted to close the cavity to a surrounding atmosphere.

23. The kit according to claim 20, further comprising at least one clamping mechanism adapted to secure the cover sheet against the substantially continuous seal.

24. The kit according to claim 20, wherein said substantially continuous seal is sufficiently flexible to accommodate an external obstacle located where a content of the pipe is to be frozen.

25. The kit according to claim 24, wherein said cover sheet is shaped to accommodate the external obstacle.

26. The kit according to claim 20, wherein the cover sheet is conformable to an external shape and diameter of a pipe.

27. The kit according to claim 20, wherein the substantially continuous seal comprises a resilient O-ring that is drapable over an outside surface of a pipe.

* * * * *